(12) United States Patent
Kim et al.

(10) Patent No.: US 7,630,726 B2
(45) Date of Patent: Dec. 8, 2009

(54) COMMUNICATION METHOD OPERATED BY SOFTWARE AND APPARATUS THEREOF

(75) Inventors: Byung-woan Kim, Seoul (KR); Sang-bum Suh, Seoul (KR); Min-young Sung, Seoul (KR); Nam-hyun Yun, Seoul (KR); Jae-wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 708 days.

(21) Appl. No.: 11/346,199

(22) Filed: Feb. 3, 2006

(65) Prior Publication Data

US 2006/0172748 A1 Aug. 3, 2006

(30) Foreign Application Priority Data

Feb. 3, 2005 (KR) .................... 10-2005-0010074

(51) Int. Cl.
*H04W 4/00* (2009.01)
(52) U.S. Cl. .................. 455/462; 455/74.1; 455/88; 455/418; 455/550.1; 455/552.1; 455/553.1; 370/310; 370/310.2; 370/319; 379/156; 379/177; 379/185
(58) Field of Classification Search ................ 455/74.1, 455/88, 418, 462, 550.1, 552.1, 553.1; 370/310, 370/310.2, 319; 379/156, 177, 185
See application file for complete search history.

(56) References Cited

U.S. PATENT DOCUMENTS

| | | | | |
|---|---|---|---|---|
| 4,768,219 A | * | 8/1988 | Yamagata et al. | 455/464 |
| 5,289,464 A | * | 2/1994 | Wang | 370/330 |
| 5,867,535 A | * | 2/1999 | Phillips et al. | 375/295 |
| 6,052,600 A | * | 4/2000 | Fette et al. | 455/509 |
| 6,091,715 A | * | 7/2000 | Vucetic et al. | 370/277 |
| 6,154,658 A | * | 11/2000 | Caci | 455/466 |
| 6,799,017 B1 | * | 9/2004 | Kregel | 455/70 |
| 7,260,369 B2 | * | 8/2007 | Feher | 455/133 |
| 7,403,556 B2 | * | 7/2008 | Kao et al. | 375/147 |
| 7,404,074 B2 | * | 7/2008 | Murotake | 713/100 |
| 2002/0082044 A1 | * | 6/2002 | Davenport | 455/552 |
| 2002/0083432 A1 | * | 6/2002 | Souissi et al. | 717/178 |
| 2003/0050055 A1 | * | 3/2003 | Ting et al. | 455/419 |
| 2004/0205164 A1 | | 10/2004 | Jacobs et al. | |

FOREIGN PATENT DOCUMENTS

| | | |
|---|---|---|
| CN | 1243410 A | 2/2000 |
| EP | 0964532 A2 | 12/1999 |

(Continued)

*Primary Examiner*—Stephen M D'Agosta
(74) *Attorney, Agent, or Firm*—Sughrue Mion, PLLC (57) ABSTRACT

A software-controlled communication method and an apparatus thereof is disclosed. The apparatus includes a radio frequency (RF) front end unit for sending a data signal or a voice signal to a cordless phone base station via an antenna, an analog-to-digital for converting an analog signal received from the RF front end unit into a digital signal and a digital-to-analog converter for converting a digital signal into an analog signal and providing the converted signal to the RF front end unit, and a baseband signal processor, having a plurality of signal processing modules for processing communication signals and a control module for controlling the signal processing modules installed therein as software modules, for providing cordless phone and handset transceiver functions.

12 Claims, 8 Drawing Sheets

FOREIGN PATENT DOCUMENTS

| | | |
|---|---|---|
| JP | 5-67998 A | 3/1993 |
| JP | 10-294701 A | 11/1998 |
| JP | 2003-219464 A | 7/2003 |
| JP | 2003-298456 A | 10/2003 |
| JP | 2003-529947 A | 10/2003 |
| JP | 2003-318802 A | 11/2003 |
| JP | 2004-153662 A | 5/2004 |
| JP | 2004-208074 A | 7/2004 |
| KR | 10-0243028 B1 | 11/1999 |
| KR | 2001-0011052 A | 2/2001 |
| WO | 2004008719 A2 | 1/2004 |

* cited by examiner

COMMUNICATION METHOD OPERATED BY SOFTWARE AND APPARATUS THEREOF

CROSS-REFERENCE TO RELATED APPLICATION

This application claims priority from Korean Patent Application No. 10-2005-0010074 filed on Feb. 3, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to software-controlled communications, and more particularly, to simultaneously supporting a 900 MHz cordless phone and a handset transceiver via software.

2. Description of the Prior Art

Figure 1:
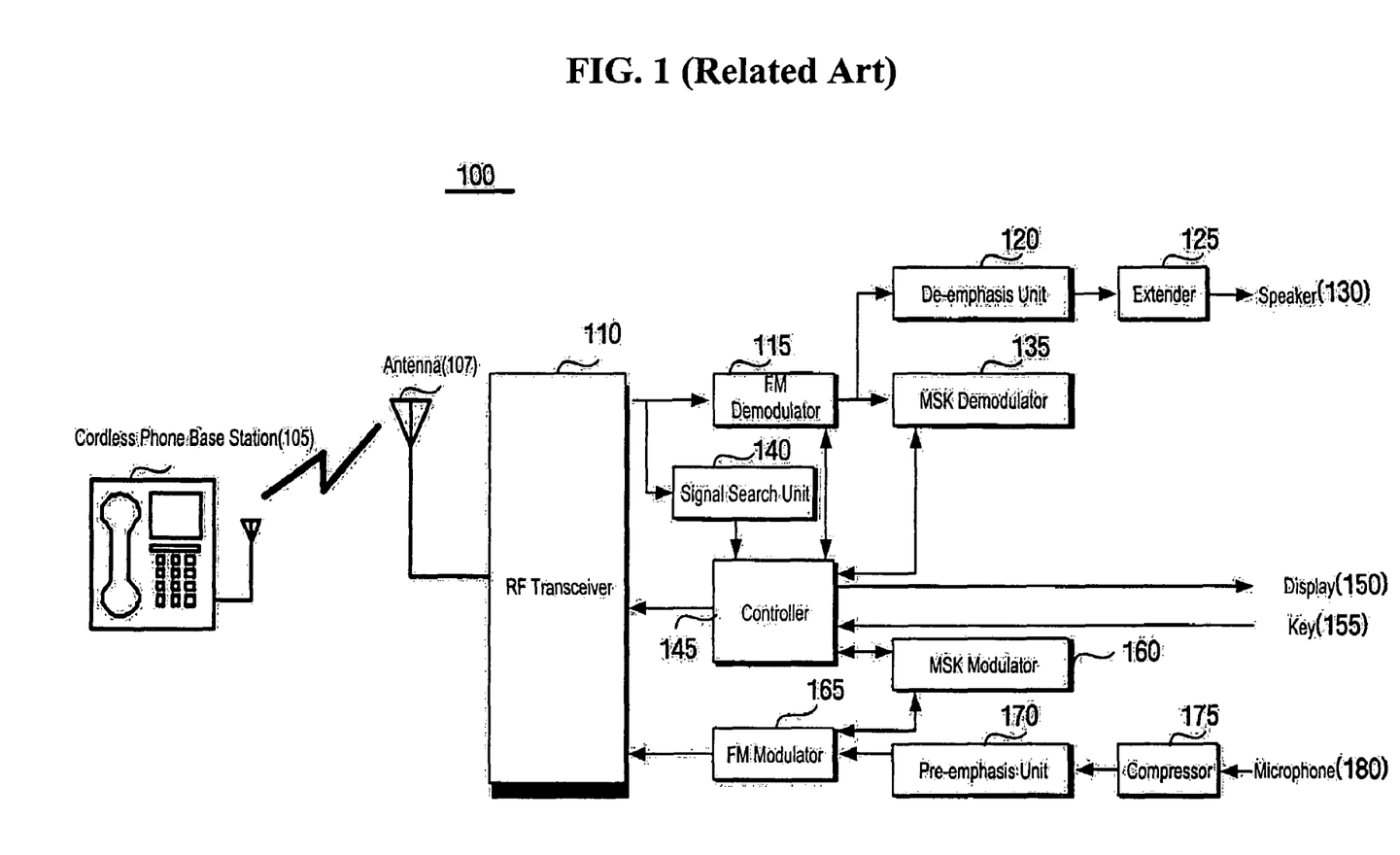
FIG. 1 is a block diagram illustrating the construction of a conventional cordless phone.

With the development of a communication technology, various cordless phones and handset transceivers have been developed. For example, FIG. 1 illustrates the construction of a conventional cordless phone.

The cordless phone 100 may include a radio frequency (RF) transceiver 110 having an antenna 107 for transmitting/receiving an RF signal; a signal search unit 140 for searching for a specific signal; a frequency modulation (FM) modulator 165 and an FM demodulator 115 for performing FM modulation and demodulation, respectively; a minimal shift keying (MSK) modulator 160 and an MSK demodulator 135 for respectively performing MSK modulation and demodulation for data communication; and circuits such as a compressor 175, an extender 125, a pre-emphasis unit 170, and a de-emphasis unit 120 for voice communication. The cordless phone 100 may also include a microphone 180, a speaker 130, a display 150, and a key 155 for a voice input/output and user interface, and a controller 145 for controlling the aforementioned constituent elements. A cordless phone base station 105 can be combined with or separated from the cordless phone 100.

First, a case where the RF transceiver 110 receives the RF signal from the cordless phone base station 105 through an antenna 107 will be described.

The controller 145 controls a local oscillator included in the RF transceiver 110 to change a reception channel while monitoring whether a signal exists in each channel. At this time, the signal search unit 140 monitors a signal level of a corresponding channel, and if it is determined that a signal exists, the FM demodulator 115 demodulates the signal. An output signal of the FM demodulator 115 is MSK-demodulated through the MSK demodulator 135 to determine whether a predetermined data frame header exists.

If it is determined that the predetermined data frame header exists, the controller 145 analyzes the MSK-demodulated signal, and controls a call depending on the content of a message received from the cordless phone base station 105. For example, if received data represents "ring on," a phone bell rings. When the line is busy and no message data exists, the signal demodulated by the FM demodulator 115 passes through the de-emphasis unit 120 and the extender 125, thereby allowing the voice call through the speaker 130.

In general, the controller 145 employs a microcomputer having firmware installed therein for control.

Now, a case where a call is made with the cordless phone 100 will be described.

First, the user presses a key 155 such as a "call" button of the cordless phone 100 to initiate the operation. At this time, the controller 145 uses a set channel or selects a channel using a method of searching for a channel having the least crosstalk, and controls the local oscillator in the RF transceiver 110 to fix the channel. The controller 145 generates a message representing "call," and the MSK modulation is performed by the MSK modulator 160. The MSK-modulated signal is FM-modulated by the FM modulator 165. The FM-modulated signal is carried in a channel selected by the RF transceiver 110; that is, the signal is transmitted to the cordless phone base station 105 through the antenna 107.

If the call is permitted by the cordless phone base station 105 and a dial tone sounds, the user can make the call by pressing numeral buttons of the cordless phone 100. At this time, data of the pressed button is transmitted to the cordless phone base station 105, and it is converted by the cordless phone base station 105 using a dual-tone-multi-frequency (DTMF) method, and the call is made.

On the other hand, the handset transceiver generally operates in a half-duplex mode where one channel is shared. In this method, a voice signal is FM/AM-modulated and carried in the channel only when a receiver button is pressed, while a channel signal is FM/AM-demodulated to reproduce voice when the receiver button is not pressed.

In the cordless phone as described above, all operations are performed by a hardware circuit, and even the firmware installed in the controller 145 that controls the system is designed to be limited only to the corresponding hardware.

Accordingly, different kinds of hardware and firmware are used by respective manufacturing companies, thereby causing many limitations in extensibility, compatibility, and reuse of appliances. These limitations are also the same as those of the handset transceiver. Although a plurality of handset transceivers of respective manufacturing companies can communicate using a frequency modulation and demodulation method, these limitations are caused by sharing (crosstalk) of a communication channel, rather than by the extensibility, compatibility and reuse of the appliances.

That is, a conventional method performs most signal controls and control processes by hardware, and thus supports only the frequency band and data communication protocol considered when designing the hardware. Accordingly, it is difficult to provide compatibility between products, or to support a new frequency band, new modulation/demodulation method, or new communication protocol. In order to solve this, a method is required whereby functions implemented by hardware are minimized and most functions are processed by software.

Such a software communication apparatus does not only facilitate the provision of a communication function of the handset transceiver or cordless phone in a computing appliance such as a personal computer (PC), but it can also be used for the development of other communication systems since it heightens the reusability of developed software, thereby greatly reducing the period for developing the system. Accordingly, a software controlled communication method is required.

SUMMARY OF THE INVENTION

Accordingly, exemplary embodiments of the present invention have been made to address the above-mentioned problems occurring in the prior art, and an object of the present invention is to provide a communication method operated by software and an apparatus thereof which can simultaneously support communications of a 900 MHz cordless phone and a handset transceiver operated by software in various computing appliances such as personal computers (PCs), notebook PCs, and personal digital assistants (PDAs).

Additional aspects and features of the invention will be set forth in part in the description which follows and in part will become apparent to those having ordinary skill in the art upon examination of the following or may be learned from practice of the invention.

In an aspect of the invention, there is provided a communication method, according to the present invention, which includes selecting a cordless phone or handset transceiver function mode through a user interface; minimum-shift-keying (MSK)-modulating a data signal corresponding to the selected function mode, and frequency-modulation (FM)-modulating the MSK-modulated data signal; converting the FM-modulated data signal to a radio frequency (RF) band signal corresponding to the selected function mode, and transmitting the converted RF band signal to a cordless phone base station; and if a user's voice signal exists in the case where the data signal is not transmitted, FM-modulating the voice signal, converting the FM-modulated voice signal to the RF band signal corresponding to the selected function mode, and transmitting the converted RF band signal to the cordless phone base station. The MSK modulation and the FM modulation are performed by software modules.

In another aspect of the present invention, there is provided a communication apparatus which includes a radio frequency (RF) front end unit for communicating a data signal or a voice signal with a cordless phone base station through an antenna; an analog-to-digital and digital-to-analog converter for converting an analog signal received from the RF front end unit into a digital signal or converting a digital signal into an analog signal, and providing the converted signal to the RF front end unit; and a baseband signal processor, having a plurality of signal processing modules processing communication signals and a control module controlling the signal processing modules installed therein as software modules, for providing cordless phone and handheld transceiver functions.

BRIEF DESCRIPTION OF THE DRAWINGS

The above and other aspects and features of the present invention will become more apparent from the following detailed description taken in conjunction with the accompanying drawings, in which.

DETAILED DESCRIPTION OF THE EXEMPLARY EMBODIMENTS OF THE PRESENT INVENTION

Hereinafter, exemplary embodiments of the present invention will be described in detail with reference to the accompanying drawings. The aspects and features of the present invention and methods for achieving the aspects and features will become apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the description of exemplary embodiments of the present invention, the same drawing reference numerals are used for the same elements across various figures.

Exemplary embodiments of the present invention are described hereinafter with reference to flowchart illustrations of user interfaces, methods, and computer programs according to exemplary embodiments of the invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

Figure 2:
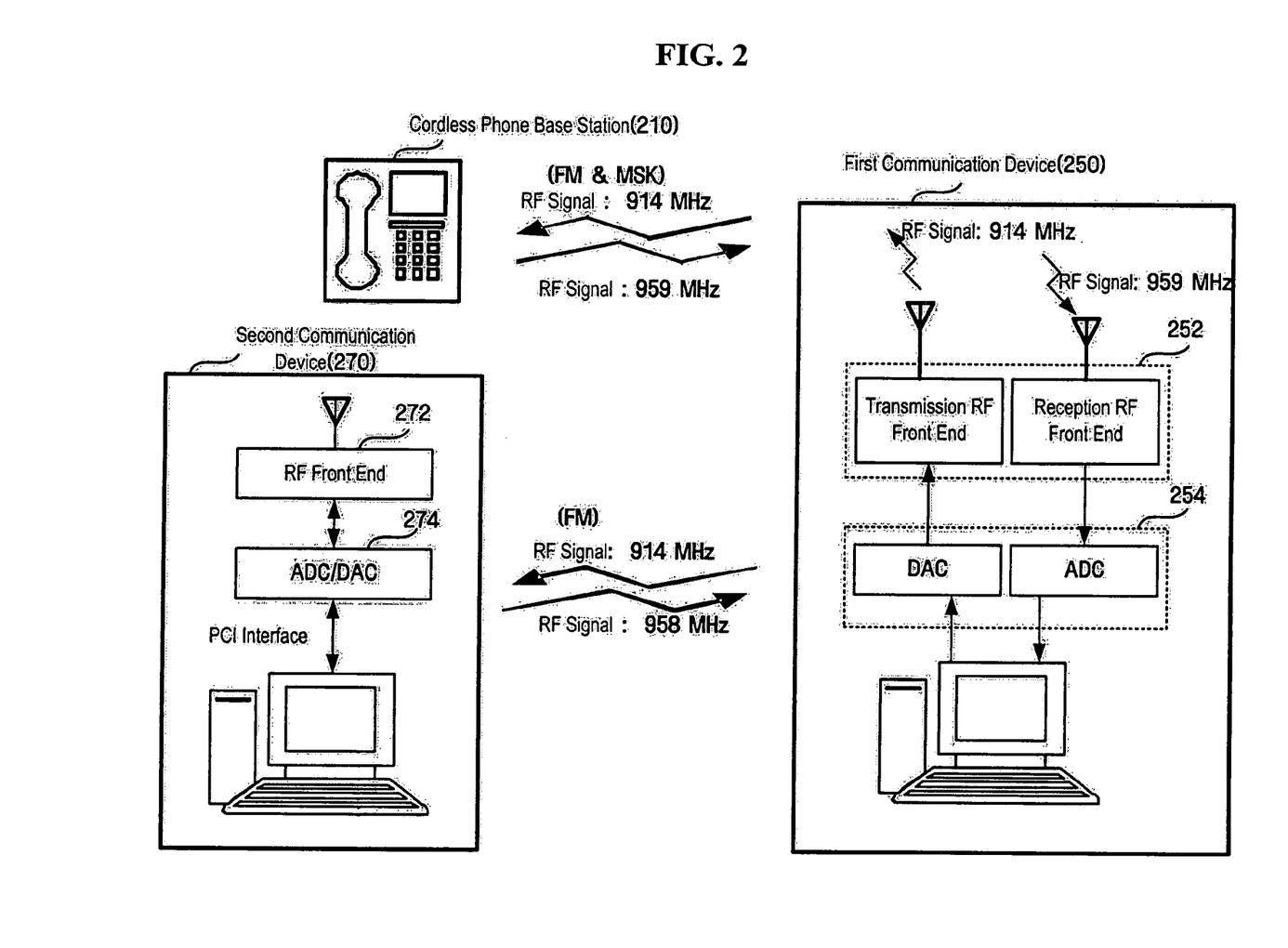
FIG. 2 is an exemplary view illustrating the construction of a system according to an exemplary embodiment of the present invention.

FIG. 2 is an exemplary view illustrating the construction of a system according to an exemplary embodiment of the present invention. The system may include a cordless phone base station 210, and a first communication device 250 and a second communication device 270 having hardware and software according to an exemplary embodiment of the present invention. The same software is executed in the first and second communication devices 250 and 270. In order to facilitate the embodying of the present invention, the first communication device 250 uses all the functions of a handset transceiver and a cordless phone, and the second communication device 270 is used only for the purpose of a frequency modulation (FM) handset transceiver.

Communication between the cordless phone base station 210 and the first communication device 250 is performed in the radio frequency (RF) band of 959 MHz to 960 MHz, and communication between the first communication device 250 and the cordless phone base station 210 is performed in the 914 MHz to 915 MHz band. A frequency bandwidth of 1 MHz is comprised of channels (channels 1 to 40) of a bandwidth of 25 KHz, and one of the channels is dynamically selected and used for communication. For this, except for RF front end units 252 and 272 for controlling a radio frequency (RF) and an intermediate frequency (IF), and an analog-to-digital converter (ADC) 254 and a digital-to-analog converter (DAC) 274 for controlling analog/digital signal conversion, all processing parts such as a data communication protocol, and a user interface are software that is executable by a central processing unit (CPU).

Even in a handset transceiver communication between the first and second communication devices 250 and 270, two frequency bands (914-915 MHz and 959-960 MHz) are used. Conventionally, handset transceivers use a half-duplex mode where one frequency band is shared. However, the invention uses parts of the RF front end units 252 and 272 for cordless phone communication, and it uses a frequency band of the cordless phone to construct a full-duplex handset transceiver, thereby minimizing the cost and time required for development. A function of the full-duplex handset transceiver can be easily embodied without changing software according to an embodiment of the present invention. In other words, this is because main signal processing of the handset transceiver, such as frequency modulation and demodulation, has been developed in software form, and therefore, it can be used as it is and the RF front end unit can be easily reconstructed.

In the system of FIG. 2, the main communication processing is performed in the software. For example, the system employs a software radio method, in which baseband processing and protocol processing, except for conversion between a 900 MHz RF signal and an IF signal having a low frequency of less than 2 MHz, and conversion between the IF signal and a digital sampled stream, are all performed by the CPU.

Figure 3:
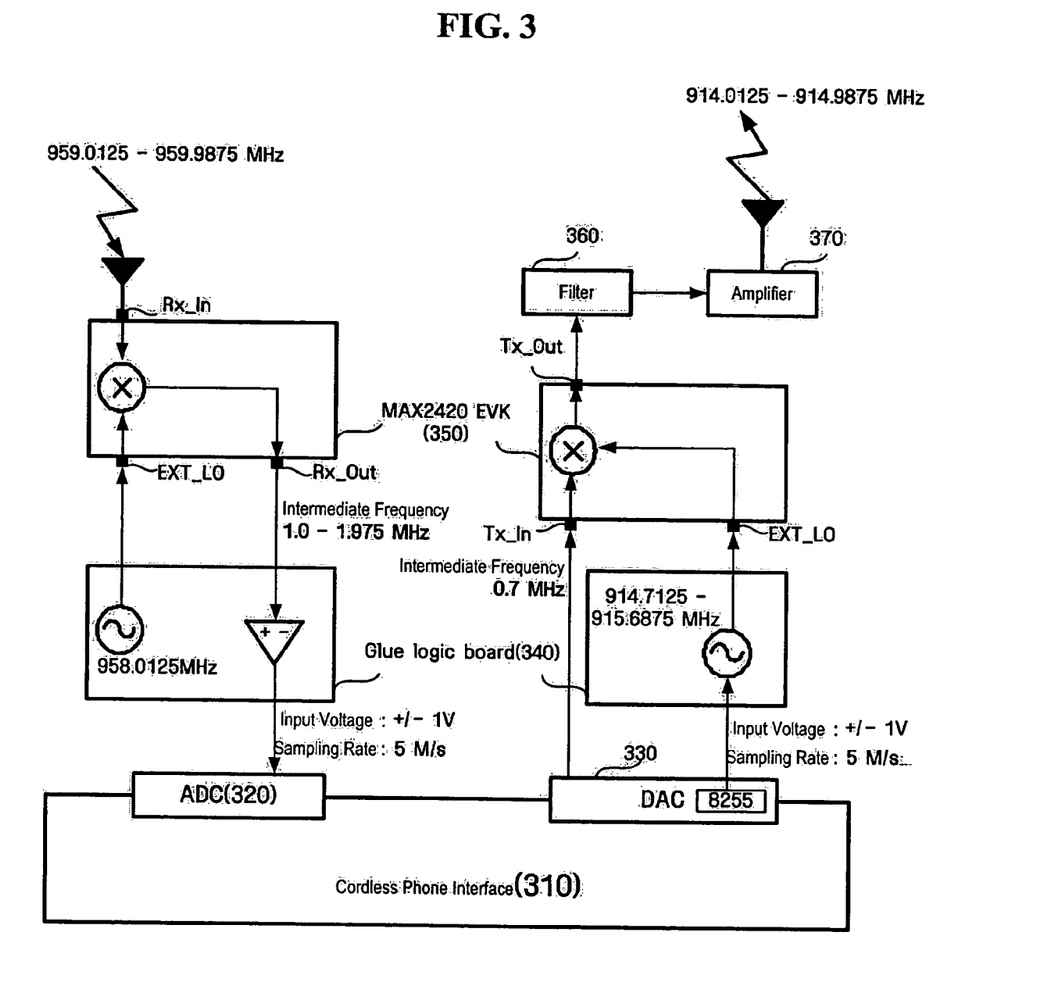
FIG. 3 is an exemplary view illustrating a hardware construction of a communication apparatus according to a first exemplary embodiment of the present invention.

FIG. 3 is an exemplary view illustrating a hardware construction of a communication apparatus according to the first exemplary embodiment of the present invention. The construction of the first communication device 250 is illustrated in FIG. 3.

Main hardware includes RF front end units 340 and 350, and ADC/DAC 320 and 330.

The RF front end units 340 and 350 down-convert a 959 MHz RF signal of the cordless phone or a 914 MHz signal of the handset transceiver into an IF signal having a band of 0.7 MHz to 2.0 MHz, or up-converts the 0.7 MHz IF signal into a 914 MHz RF signal for the cordless phone or a 959 MHz for the handset transceiver.

The ADC 320 serves to sample an analog IF signal and generate the digital sampled stream, and the DAC 330 serves to generate the analog IF signal from the digital sampled stream.

In the construction and operation of the first communication device 250, when the RF signal is received from the cordless phone base station 210, the MAX 2420 evaluation board (hereinafter referred to as "MAX2420 EVK") manufactured by Maxim Co., Ltd.; that is, a 900 MHz image-reject transceiver chip may be used for the RF-IF conversion.

The MAX2420 EVK was originally manufactured for the purpose of observing a characteristic of the MAX2420 chip, and therefore, a built-in voltage controlled oscillator (VCO) is not good for communication; it needs to amplify the IF signal to the input voltage level (+/−1 volt) of the ADC board 320 due to the low power of the IF signal. In order to solve this, an external local oscillator and amplifier are added using a separate glue logic board 340.

The RF signal received from the cordless phone base station 210 through an antenna has a center frequency of 959.0125 MHz (channel 1) to 959.9875 MHz (channel 40). The RF signal is inputted to a Rx_In terminal of the MAX2420 EVK 350 and mixed with a signal of the 968.0125 MHz local oscillator of the glue logic board 340, thereby generating the IF signal in the 1.0 MHz to 1.975 MHz range.

This IF signal is outputted through a Rx_Out terminal of the MAX2420 EVK 350 and amplified to have an appropriate power in the amplifier of the glue logic board 340, and is then applied to the ADC board 320. For example, the PCI-DAS4020 board manufactured by Measurement Computing Co., Ltd. is used as the ADC 320.

The PCI-DAS4020 board supports a sampling rate of 20 MHz to the maximum, and in this embodiment, a sampling rate of 5 MHz is used. This is because since a maximal IF is less than 2.0 MHz, it is enough that a sampling rate be 4 MHz or more, according to Nyquist theory, and overload of the system bus caused by an unnecessarily high sampling rate, and reduction of a total performance can be prevented. For example, a sample size is 12 bits.

When the signal is applied to the PCI-DAS4020 320 and passes through a cordless phone interface 310, voice or data is restored using the software installed in the first communication device 250.

On the other hand, in construction and operation of the first communication device 250, when the RF signal is transmitted to the cordless phone base station 210, the digital sampled stream generated by the software installed in the first communication device 250 is a FM modulated signal having a center frequency of 700 KHz. This signal has a sampling rate of 5 MHz, and is applied to the DAC board 330 and converted into the IF signal. For example, the DAC board 330 employs the DAQ2010 manufactured by ADLINK Technology Co., Ltd. The DAQ2010 330 can have a built-in 8255 chip to select a transmission channel. In an embodiment of the present invention, the 8255 chip is used to control the voltage controlled oscillator to generate a specific external local oscillation frequency in the 914.7125 MHz to 915.6875 MHz range.

The IF signal is inputted to the MAX2420 board 350 and mixed with a signal of a 914.7125 MHz to 915.6875 MHz external local oscillator, thereby generating the RF signal having 914.0125 MHz to 914.9875 MHz corresponding a difference therebetween. The generated RF signal is outputted to a Tx_Out terminal of the MAX2420 board 350, and is then inputted to a filter 360. The filter 360 can employ a surface acoustic wave (SAW) band pass filter. For example, the SAW filter allows passage of a band of+/−10 MHz centering on 914.5 MHz.

The RF signal passes through the filter 360 and is transmitted to the cordless phone base station 210 via the amplifier 370 and the antenna.

Figure 4:
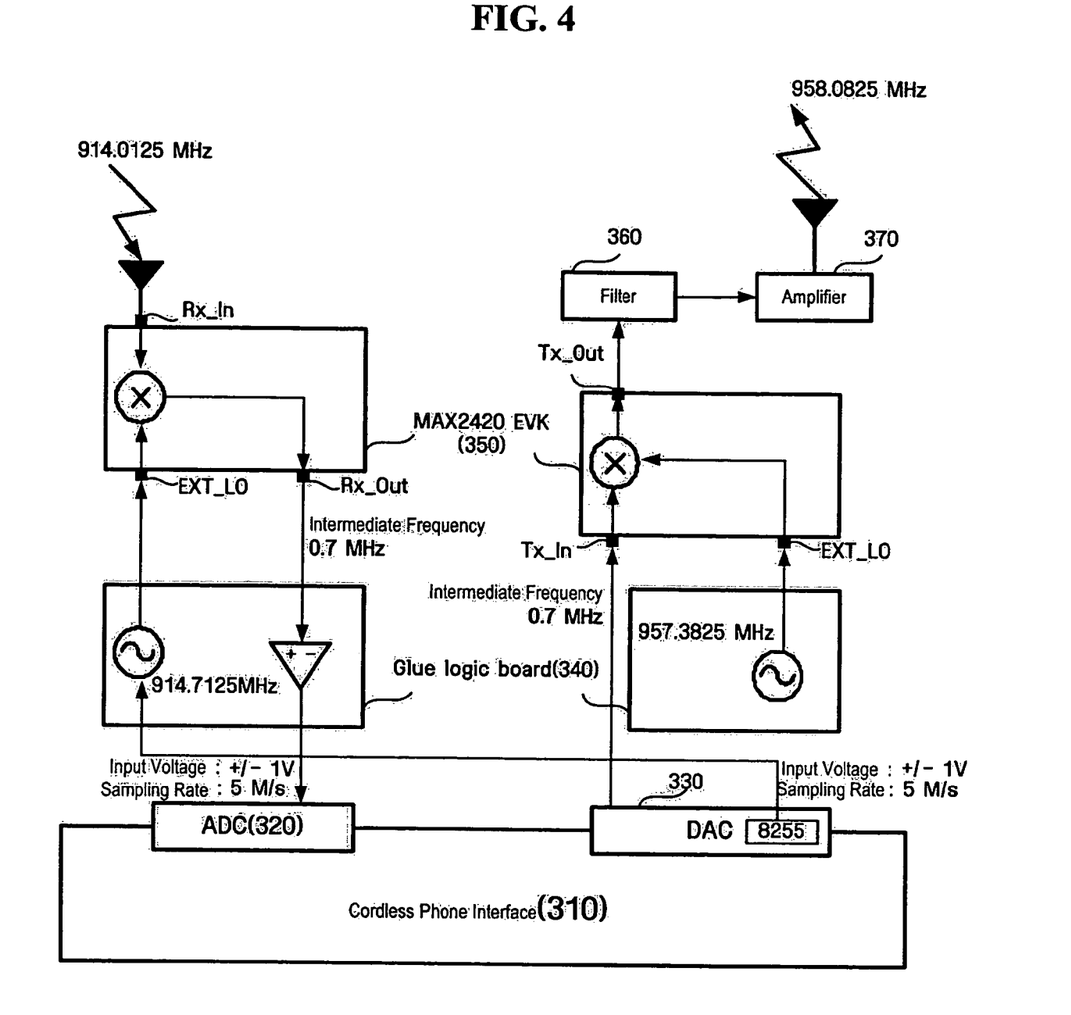
FIG. 4 is an exemplary view illustrating a hardware construction of a communication apparatus according to a second exemplary embodiment of the present invention.

FIG. 4 is an exemplary view illustrating a hardware construction of a communication apparatus according to the second exemplary embodiment of the present invention. The construction of the second communication device 270 is illustrated in FIG. 4. The second communication device 270 has a similar basic construction as the first communication device 250, and therefore, its detailed description has been omitted. The received RF signal is an FM-modulated signal having a center frequency of 914.0125 MHz, and it is mixed with a 914.7125 MHz signal of the external local oscillator controlled by the 8255 chip, thereby generating the 0.7 MHz IF signal. On the contrary, the transmitter can be constructed to generate the 958.0825 MHz RF signal.

Figure 5:
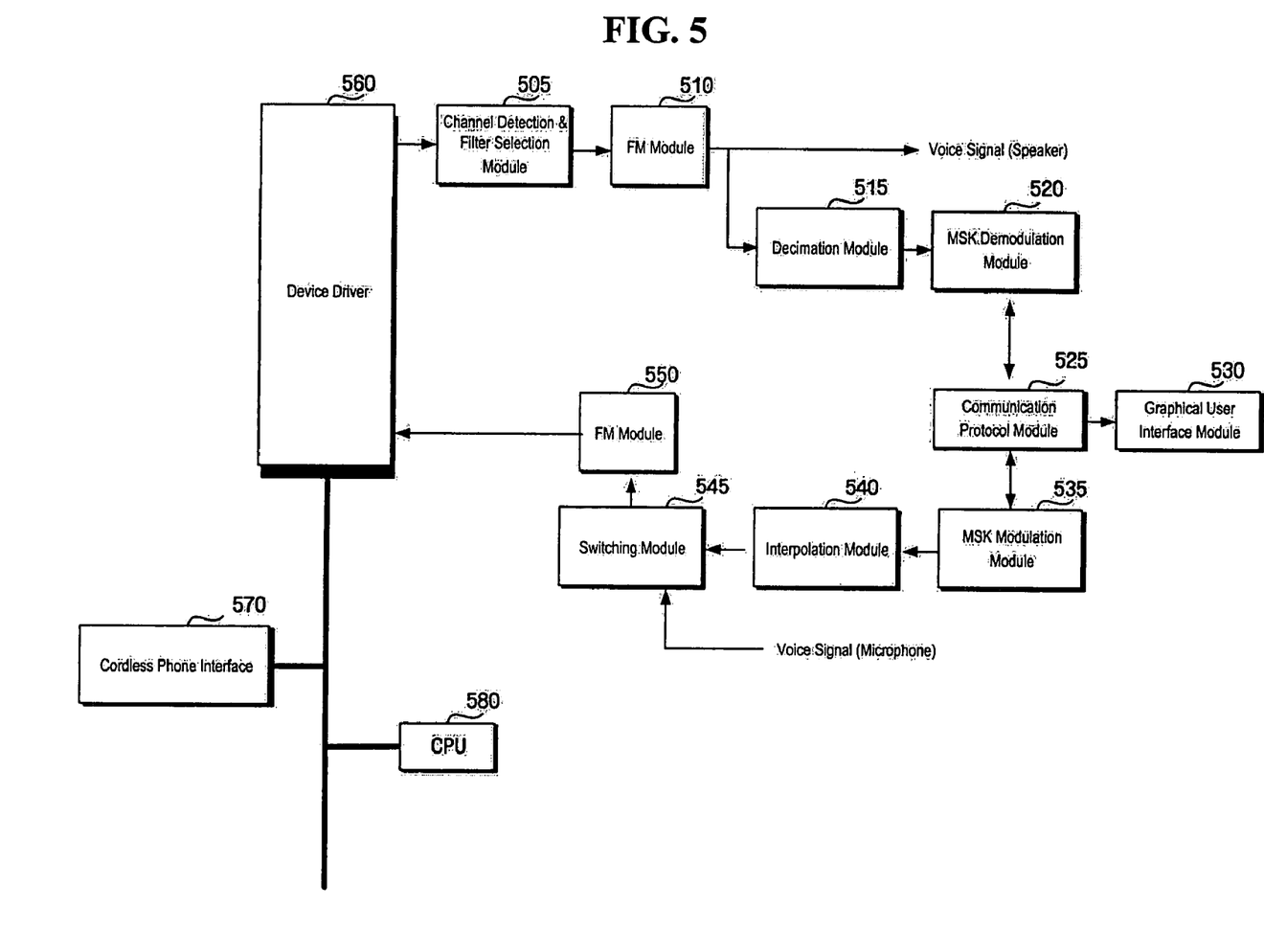
FIG. 5 is an exemplary view illustrating software blocks for communication according to an exemplary embodiment of the present invention.

FIG. 5 is an exemplary view illustrating software blocks for communication according to an exemplary embodiment of the present invention. The software is installed in the first or second communication device 250 or 270.

A CPU 580 is connected through a bus with a cordless phone interface 570 and a device driver 560. The cordless phone interface 570 corresponds to the cordless phone interface 310 shown in FIGS. 3 and 4. The CPU 580 can set information on whether to provide a cordless phone function or a handset transceiver function, in the cordless phone interface 570, thereby controlling the RF front end unit connected with the cordless phone interface 570.

The software can be briefly classified into a control module and a signal processing module. A communication protocol module 525 and a graphical user interface module 530 belong to the control module. A channel detection and filter selection module 505, FM demodulation and modulation modules 510 and 550, decimation and interpolation modules 515 and 540, minimum shift keying (MSK) demodulation and modulation modules 535, and a switching module 545 can be classified as the signal processing module.

The received RF signal is converted into the analog IF signal through the RF front end unit, and the converted analog IF signal is converted into the 12-bit 5 MS/s digital sampled stream through the ADC board, and is inputted to the device driver 560 through the cordless phone interface 570. Then, sampled data is transmitted to the channel detection and filter selection module 505.

The channel detection and filter selection module 505 detects the signal and chooses a corresponding channel. In the case where the cordless phone function is performed, the cordless phone base station transmits the signal over a specific channel in the IF range of 1.0 MHz to 2.0 MHz. At this time, the channel detection and filter selection module 505 detects the channel selected by the cordless phone base station using a method for detecting a frequency of a high intensity through fast Fourier transform (FFT) of the input signal.

Once the channel detection and filter selection module 505 chooses a center frequency of an signal, it performs translation of a signal having a corresponding center frequency into a signal having 0 Hz, finite impulse response (FIR) filtering (low pass filter), and decimation. These processes, which are other functions of the channel detection and filter selection module 505, can greatly reduce the sampling rate, thereby later reducing the operational load for signal processing. In a detailed description, as described above, the channel detection and filter selection module 505 can process the two operations of channel search and channel selection at one time, thereby decreasing the processing time. The channel detection uses a method of obtaining a per-channel signal intensity of a whole channel through the FFT operation for the signal inputted from the ADC, and then determines whether a channel signal transmitted from the cordless phone base station exists in order to search for it. Further, if it is determined that the signal exists, a function to average the frequency of the detected signal to obtain the center frequency of the channel is performed. In the channel selection operation, the center frequency detected by a channel filter performing a batch frequency translation, low pass filtering, and decimation is converted to 0 Hz and passes through the filter, and then the sampling rate is reduced, thereby reducing the amount of signal processing operations.

The signal passing through the channel detection and filter selection module 505 is demodulated in the FM demodulation module 510. The FM demodulation can employ a quadrature FM demodulation method. In this method, an inputted FM modulation signal sample is divided into an I-channel and a Q-channel and the amount of phase variation is obtained by an arctangent operation using a value of each of the I/Q-channels, thereby demodulating an original signal. A message signal can be detected from the demodulated signal, and may be a voice signal or a MSK-modulated data signal.

When the message signal is a voice signal, it is outputted to a speaker. When the message signal is a data signal, it is inputted to the decimation module 515.

The decimation module 515 is a software module for adjusting the sampling rate between the signal processing modules, and it reduces the sampling rate to a multiple of the received rate. In other words, if a signal of 3 MHz is trebly decimated, a signal of 1 MHz is generated. For example, in the case where data of {1,4,7,10,13,16} are inputted and the sampling rate is trebly reduced, only the first and fourth datum are selected, and {1,10} is outputted.

The signal outputted by the decimation module 515 is transmitted to the MSK demodulation module 520, and is converted into a bit stream.

The MSK demodulation module 520 again demodulates a MSK-modulated analog signal sample into digital data. In an exemplary embodiment of the present invention, the analog signal sample is separated into a frequency component representing "0" and "1" using a noncoherent method. Further, a portion of tracking and amending bit-synchronization can be added for the input data, thereby also improving the capability of MSK demodulation.

In the case where the MSK-demodulated bit stream is an effective frame having a start pattern of a data frame transmitted from the cordless phone base station, it is inserted into a reception frame queue (not shown). The inserted frame can be dequeued and processed by the communication protocol module 525.

The communication protocol module 525 accesses and/or controls a reception frame queue, a graphical user interface, and a transmission frame queue on the basis of input data of a received signal and user input, or processes an event therefrom, thereby supporting the communication of the cordless phone or handset transceiver function. In other words, the communication protocol module 525 searches for an operation corresponding to a protocol of the cordless phone and the handset transceiver, controls each software module including the graphical user interface, periodically confirms a message of a transmission and reception frame queue, and processes the message inputted to the queue.

Figure 6:
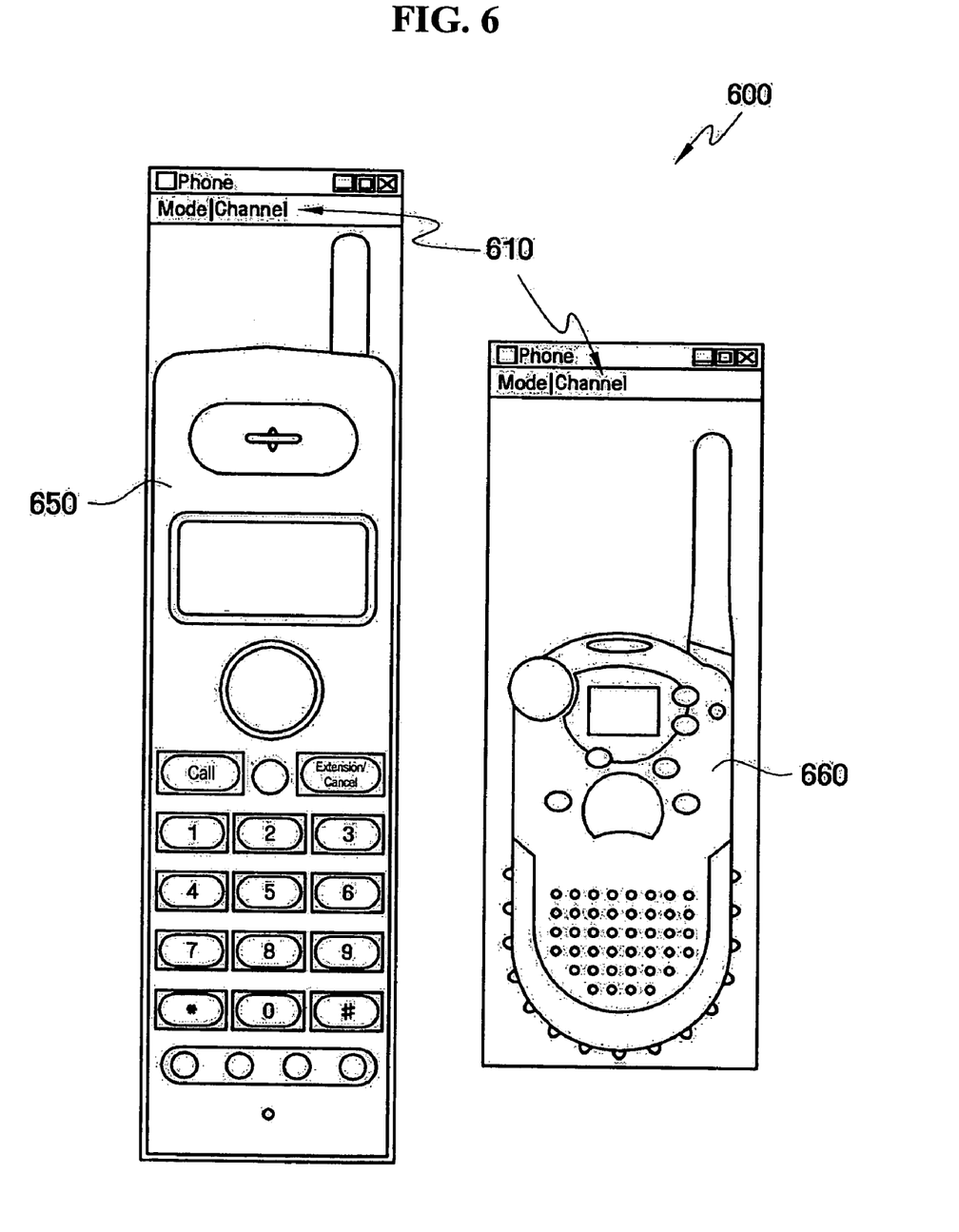
FIG. 6 is an exemplary view illustrating a user interface according to an exemplary embodiment of the present invention.

The graphical user interface module 530 provides the graphical user interface as shown in FIG. 6. The graphical user interface can flicker a destination lamp or show the message to the user. Further, through a method where the user clicks a button using a mouse or inputs a specific value in a menu, user convenience of the cordless phone or handheld transceiver function is enhanced.

The data frame to be transmitted to the cordless phone base station is positioned in the transmission frame queue (not shown). In the case where there exists the frame to be transmitted to the transmission frame queue, the bit stream constituting the frame is transmitted to the MSK modulation module 535. The transmitted bit stream is converted into a sine wave by the MSK modulation module 535. MSK modulation is a method where data bits of 0 and 1 are transmitted using a different frequency, respectively, and it is characterized in that each of the modulated signals stores a phase of a previous signal, thereby making the phases identical with one another. In an embodiment of the present invention, one data bit is represented by twenty five sine-waves representing "0" or "1". As a result, the input data of 2400 bps is converted into a signal sample of 60 K/sec.

The signal modulated by the MSK modulation module 535 is transmitted to the interpolation module 540.

The interpolation module 540 increases the sampling rate to a multiple of the input. In other words, if the 1 MHz signal is trebly interpolated, a 3 MHz signal is generated and outputted. At this time, in order to remove a step phenomenon, a method of using an increment between data is used. For example, in the case where data of {1,10, . . . } is inputted, if repetitive outputs are simply performed three times, the step phenomenon between output data such as: {1,1,1,10, . . . } is generated. Therefore, an increment of (10−1)/3=3 is obtained, and then, sequential addition as much as the increment is performed and outputted as: {1,4,7,10, . . . }.

The signal outputted from the interpolation module 540 is transmitted to the FM modulation module 550 through the switching module 545.

The switching module 545 has a function for transmitting only one of the MSK modulated signal or the voice signal inputted from a microphone to the FM modulation module 550. In other words, if there exists a data frame to be transmitted, the MSK modulated signal is selected. Otherwise, the voice signal is selected.

The selecting of the data is performed on the basis of the MSK modulated data since the MSK modulated data has a priority over the voice. If the data exists, the MSK modulation data has the form of a continuous sine wave, and if no data exists, "0" is continuously transmitted, and therefore, it is determined whether "0" has been continuously received in order to determine whether MSK-modulated data exists.

The FM modulation module 550 FM-modulates the signal selected by the switching module 545. The FM modulation by the FM modulation module 550 is performed using a method where the amount of phase variation of the input signal is added, on the basis of a carrier frequency of 700 KHz. In an exemplary embodiment of the present invention, in order to obtain a magnitude of the sine wave corresponding to each phase, in an initialization step a look-up table of a sine wave is manufactured, thereby increasing the arithmetic rate of the signal processing.

The signal modulated by the FM modulation module 550 is transmitted to the DAC board 330 shown in FIG. 3 or 4 through the device driver 560 and the cordless phone interface 570, and is converted into an analog signal.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

FIG. 6 is an exemplary view illustrating a user interface according to an embodiment of the present invention. In FIG. 6, a graphical user interface 600 is illustrated when software for both the cordless phone and the handset transceiver is executed under the Linux operating system.

Referring to FIG. 6, the user interface of the cordless phone handset 650 and the handset transceiver 660 depending on the function mode is provided.

The function mode can be selected in a menu 610 positioned at the top of the user interface of FIG. 6. In a cordless phone handset mode, the user can receive an incoming call or can dial and make a call as if he/she uses a general cordless phone. Similarly, in a handset transceiver mode, the user uses the user interface according to a method of using the handset transceiver. In other words, the user can talk while pressing a predetermined button.

Figure 7:
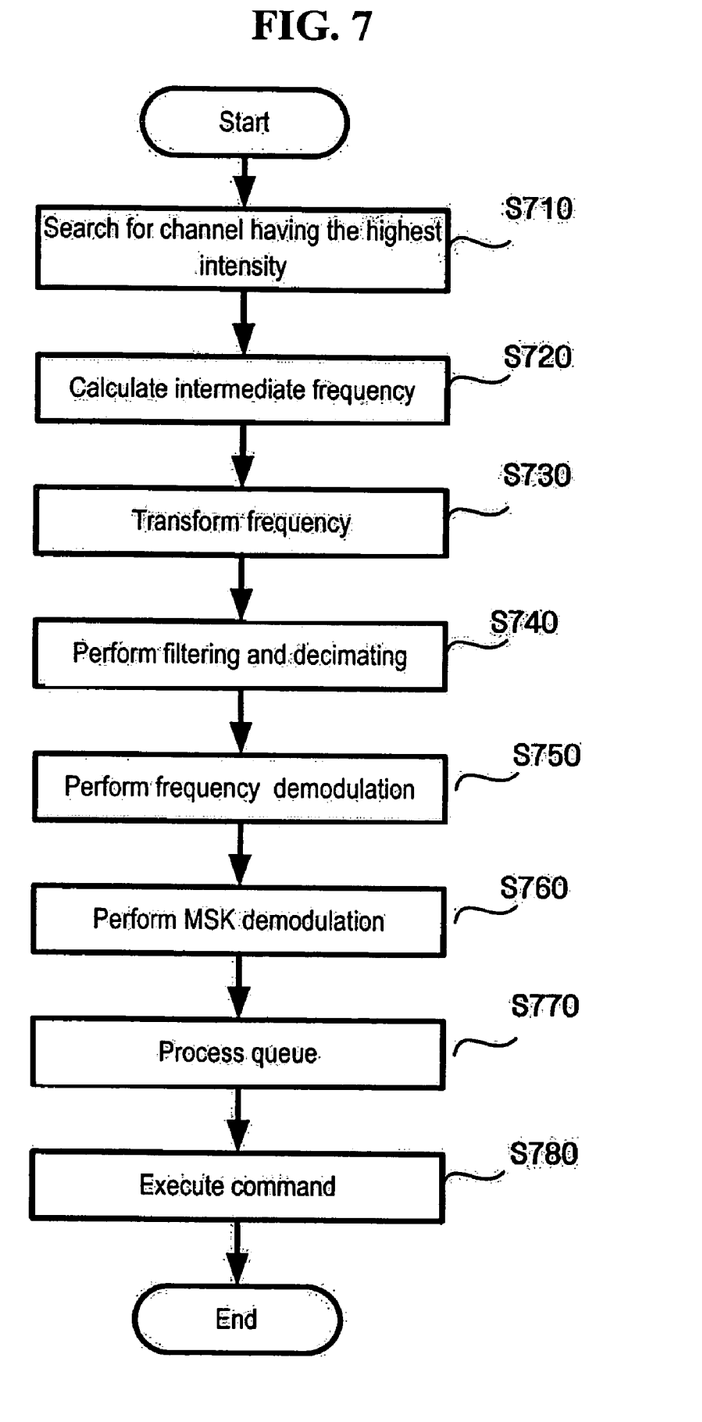
FIG. 7 is a flowchart illustrating a process of receiving a message according to an exemplary embodiment of the present invention.

FIG. 7 is a flowchart illustrating a process of receiving a message according to an exemplary embodiment of the present invention. The following is an example of a process in the apparatus, in which, if the call is received from the outside, a "ring" message is received over channel 13 from the cordless phone base station, and the destination lamp flickers on a screen.

First, through the FFT operation on data inputted to the channel detection and filter selection module 505, the channel having the highest intensity is searched, and it is recognized that the channel where the signal is sustained with the highest intensity is channel 13 S710, and then an intermediate frequency of a signal received within channel 13 is calculated S720. After that, the reception channel and the intermediate frequency are set to channel 13, and the intermediate frequency is calculated, and then the frequency translation, the low frequency filtering, and the decimation are performed S730 and S740.

The signal outputted from the channel detection and filter selection module 505 is FM-demodulated and is converted into a baseband signal. The converted baseband signal can be the voice signal or the data signal S750. Accordingly, the signal outputted from the channel detection and filter selection module 505 is transmitted to a voice output module (for example, a speaker) and a data processing module, respectively. Here, call connection is not made at present, and therefore, transmission to the voice output module will be disregarded.

The FM demodulated signal is MSK demodulated through the decimation S760. In the case where the frame of the demodulated signal is a normal frame, it is accumulated in the queue. At this time, the communication protocol module 525, which is monitoring the queue, can recognize that a "ring" command has been received through the frame S770. Accordingly, the communication protocol module 525 flickers the destination lamp and a character string of "ring" on the screen together with a bell sound S780.

Figure 8:
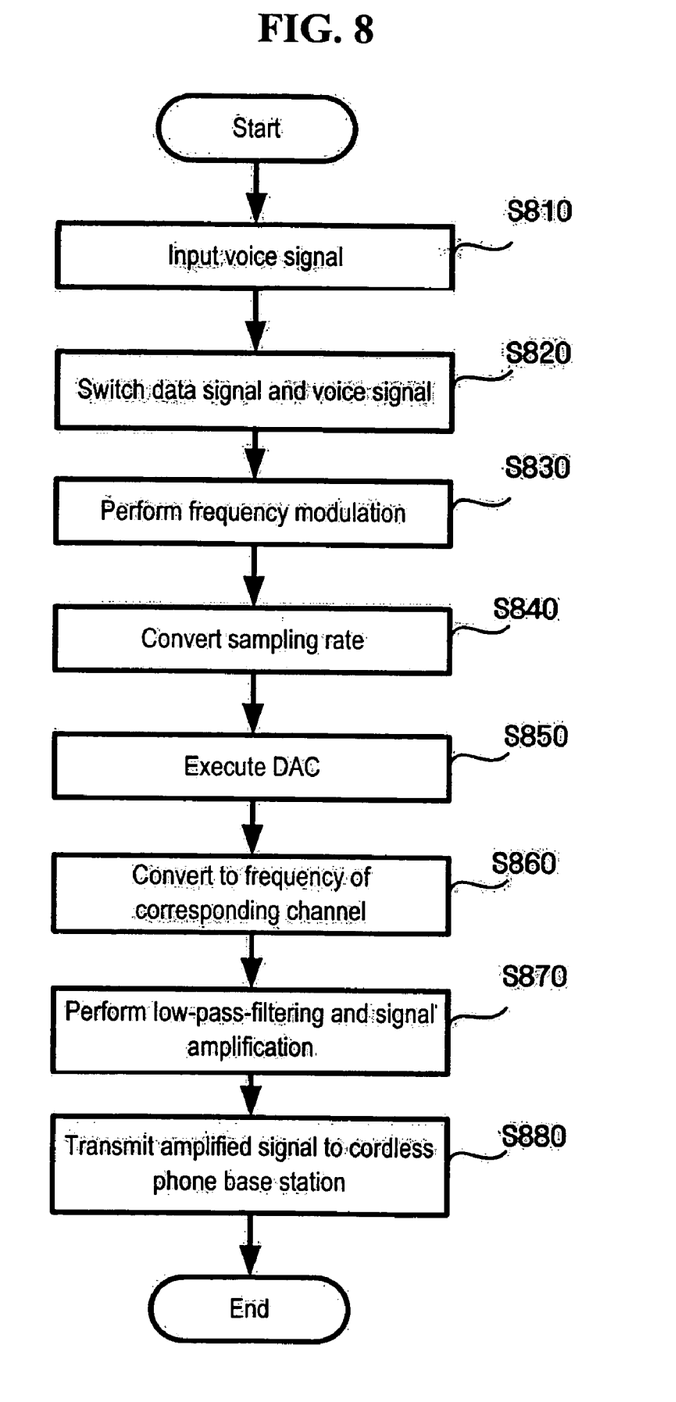
FIG. 8 is a flowchart illustrating a process of transmitting voice according to an exemplary embodiment of the present invention.

FIG. 8 is a flowchart illustrating a process of transmitting voice according to an exemplary embodiment of the present invention; it exemplifies a process of transmitting a user voice to the cordless phone base station if the line is busy.

The user voice is inputted through a sound card of a personal computer (PC) S810. At this time, the voice signal is processed by the sound card to produce a digital signal, and is transmitted to the switching module 545 at a rate of 40 KHz.

If no data signal exists, the switching module 545 selects and transmits only the voice signal to the FM modulation module 550 S820. The FM modulation module 550 FM-modulates the transmitted baseband voice signal with a 700 KHz carrier S830. Through the FM modulation, a 40 KHz input signal is converted into a 5 MHz signal S840, and the converted signal is transmitted to the DAC board 330 shown in FIG. 3. The digital data transmitted to the DAC board 330 is converted into the FM modulated analog signal having the 700 KHz carrier, and is inputted to the RF front end unit, that is, the MAX2420 EVK 350 shown in FIG. 3 S850.

The signal inputted to the MAX2420 EVK 350 is mixed with a signal of the external local oscillator and converted to a frequency of the corresponding channel S860, and is transmitted to the cordless phone base station through the SAW typed band pass filter 360 and the amplifier 370 S870 and S880.

The communication apparatus operated by the software according to exemplary embodiments of the present invention has an effect that, by performing the signal processing and the control processing by software, except for the RF/IF conversion and the ADC/DAC, functions of the 900 MHz cordless phone and handset transceiver can be used in various computing appliances such as PCs, notebook PCs, and personal digital assistants (PDAs) if the hardware of the RF/IF conversion and the ADC/DAC is portable size and has a PC peripheral device interface such as a universal serial bus (USB).

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A communication method comprising:
   selecting one of a cordless phone and a handset transceiver function mode through a user interface;
   minimum-shift-keying (MSK)-modulating a data signal corresponding to the selected function mode, and frequency-modulating (FM) the MSK-modulated data signal;
   converting the FM-modulated data signal to a radio frequency (RF) band signal corresponding to the selected function mode, and transmitting the converted RF band signal to a cordless phone base station;
   if a voice signal exists when the data signal is not transmitted, FM-modulating the voice signal, converting the FM-modulated voice signal to the RF band signal corresponding to the selected function mode, and transmitting the converted RF band signal to the cordless phone base station;
   detecting and filtering a channel of a signal selected by the cordless phone base station if the RF signal is received from the cordless phone base station;
   FM-demodulating the filtered signal;
   outputting the voice signal through a speaker when the FM-demodulated signal is a voice signal; and
   decimating the FM demodulated data signal, MSK-demodulating the decimated data signal, and executing a command corresponding to the MSK demodulated data signal if the FM-demodulated signal is a data signal,
   wherein the operation of MSK demodulating the data signal comprises:
   determining whether a frame that forms the MSK-demodulated data signal is an effective frame;
   storing the frame in a queue, if the frame is an effective frame; and
   dequeuing the stored frame,
   wherein the MSK modulation and the FM modulation are performed by software modules.

2. The method as claimed in claim 1, wherein the channel detection is performed through Fast Fourier transform (FFT) of an input signal and detection of a frequency having a high intensity.

3. The method as claimed in claim 1, wherein the frequency modulation is performed by a quadrature FM method.

4. The method as claimed in claim 1, further comprising interpolating the MSK modulated data signal, and frequency modulating the interpolated data signal.

5. The method as claimed in claim 1, further comprising, if the value of "0" is continuously inputted as the MSK-modulated data signal, determining that the data signal has not been transmitted.

6. The method as claimed in claim 1, wherein the frequency modulation uses a carrier frequency of 700 KHz.

7. A communication apparatus comprising:
   a radio frequency (RF) front end unit which communicates one of a data signal and a voice signal to a cordless phone base station through an antenna;
   an analog-to-digital unit which converts an analog signal received from the RF front end unit into a digital signal, or for converting a digital signal into an analog signal and providing the analog signal to the RF front end unit; and
   a baseband signal processor, having a plurality of signal processing modules for processing communication signals, and a control module which controls the signal processing modules installed therein as software modules, said base band signal processor providing cordless phone and handset transceiver functions,
   wherein at least one of the signal processing modules comprises:
   a channel detection and filter selection module which detects and filters a channel of a signal selected by the cordless phone base station;
   a frequency demodulation module which frequency demodulates the filtered signal;
   a decimation module which decimates the frequency demodulated signal if the frequency demodulated signal is a data signal; and
   a MSK demodulation module which MSK-demodulates the decimated signal,
   wherein the control module executes a command corresponding to the MSK demodulated data signal,
   wherein the channel detection and filter selection module performs a fast Fourier transform (FFT) on an input signal, detects the frequency having a high intensity, and detects the channel.

8. The apparatus as claimed in claim 7, wherein the control module comprises:
   a communication protocol module which performs operations corresponding to protocols of a cordless phone and a handset transceiver, periodically confirms a message of a transmission or reception frame queue, and processes the message inputted to the queue; and
   a graphical user interface module which provides a user with a user interface for performing the operation.

9. The apparatus as claimed in claim 7, wherein at least one of the signal processing modules comprises:
   a minimum-shift-keying (MSK) modulation module which MSK-modulates a bit stream constituting a data frame to be transmitted to the cordless phone base station;
   an interpolation module which interpolates the MSK-modulated data signal;

a frequency modulation module which frequency modulates (FM) the data signal received from the interpolation module; and a switching module which receives the voice signal from a user and the data signal from the interpolation module, switches the voice signal and the data signal, and transmits the switched signals to the FM modulation module.

10. A communication apparatus comprising:

a radio frequency (RE) front end unit which communicates one of a data signal and a voice signal to a cordless phone base station through an antenna;

an analog-to-digital unit which converts an analog signal received from the RF front end unit into a digital signal, or for converting a digital signal into an analog signal and providing the analog signal to the RF front end unit; and a baseband signal processor, having a plurality of signal processing modules for processing communication signals, and a control module which controls the signal processing modules installed therein as software modules, said base band signal processor providing cordless phone and handset transceiver functions, wherein at least one of the signal processing modules comprises:

a channel detection and filter selection module which detects and filters a channel of a signal selected by the cordless phone base station;

a frequency demodulation module which frequency demodulates the filtered signal;

a decimation module which decimates the frequency demodulated signal if the frequency demodulated signal is a data signal; and a MSK demodulation module which MSK-demodulates the decimated signal, wherein the control module executes a command corresponding to the MSK demodulated data signal, wherein the frequency demodulation is performed through a quadrature frequency demodulation method.

11. A communication apparatus comprising:

a radio frequency (RF) front end unit which communicates one of a data signal and a voice signal to a cordless phone base station through an antenna;

an analog-to-digital unit which converts an analog signal received from the RF front end unit into a digital signal, or for converting a digital signal into an analog signal and providing the analog signal to the RF front end unit; and a baseband signal processor, having a plurality of signal processing modules for processing communication signals, and a control module which controls the signal processing modules installed therein as software modules, said base band signal processor providing cordless phone and handset transceiver functions, wherein at least one of the signal processing modules comprises:

a minimum-shift-keying (MSK) modulation module which MSK-modulates a bit stream constituting a data frame to be transmitted to the cordless phone base station;

an interpolation module which interpolates the MSK-modulated data signal;

a frequency modulation module which frequency modulates (FM) the data signal received from the interpolation module; and a switching module which receives the voice signal from a user and the data signal from the interpolation module, switches the voice signal and the data signal, and transmits the switched signals to the FM modulation module, wherein if a value of the data signal received from the interpolation module is continuously "0," the switching module determines that the data signal has not been transmitted, and transmits the voice signal to the FM module.

12. A communication apparatus comprising:

a radio frequency (RF) front end unit which communicates one of a data signal and a voice signal to a cordless phone base station through an antenna;

an analog-to-digital unit which converts an analog signal received from the RF front end unit into a digital signal, or for convening a digital signal into an analog signal and providing the analog signal to the RF front end unit; and a baseband signal processor, having a plurality of signal processing modules for processing communication signals, and a control module which controls the signal processing modules installed therein as software modules, said base band signal processor providing cordless phone and handset transceiver functions, wherein at least one of the signal processing modules comprises:

a minimum-shift-keying (MSK) modulation module which MSK-modulates a bit stream constituting a data frame to be transmitted to the cordless phone base station;

an interpolation module which interpolates the MSK-modulated data signal;

a frequency modulation module which frequency modulates (FM) the data signal received from the interpolation module; and a switching module which receives the voice signal from a user and the data signal from the interpolation module, switches the voice signal and the data signal, and transmits the switched signals to the FM modulation module, wherein the frequency modulation uses a carrier frequency of 700 KHz.

* * * * *